United States Patent
Sung

(10) Patent No.: US 9,463,552 B2
(45) Date of Patent: Oct. 11, 2016

(54) SUPERBRASVIE TOOLS CONTAINING UNIFORMLY LEVELED SUPERABRASIVE PARTICLES AND ASSOCIATED METHODS

(76) Inventor: Chien-Min Sung, Tansui (TW)

(*) Notice: Subject to any disclaimer, the term of this patent is extended or adjusted under 35 U.S.C. 154(b) by 792 days.

(21) Appl. No.: 13/113,779

(22) Filed: May 23, 2011

(65) Prior Publication Data

US 2011/0293905 A1    Dec. 1, 2011

Related U.S. Application Data

(63) Continuation of application No. 12/463,897, filed on May 11, 2009, now Pat. No. 8,104,464, which is a (Continued)

(51) Int. Cl.

| B24B 53/017 | (2012.01) |
|---|---|
| B24D 11/00 | (2006.01) |
| B24B 53/02 | (2012.01) |
| B24D 3/06 | (2006.01) |
| B01J 3/06 | (2006.01) |

(52) U.S. Cl.
CPC .............. *B24B 53/017* (2013.01); *B01J 3/062* (2013.01); *B24B 53/02* (2013.01); *B24D 3/06* (2013.01); *B24D 11/005* (2013.01); *B01J 2203/061* (2013.01); *B01J 2203/062* (2013.01); *B01J 2203/066* (2013.01); *B01J 2203/068* (2013.01); *B01J 2203/0645* (2013.01); *B01J 2203/0655* (2013.01); *Y10T 428/24893* (2015.01)

(58) Field of Classification Search
CPC ..... B24D 3/06; B24D 11/005; B24B 53/017; B24B 53/02

USPC ....... 51/297; 125/16.02, 21.12, 22; 451/527, 451/529, 533, 544

See application file for complete search history.

(56) References Cited

U.S. PATENT DOCUMENTS

| 187,593 | A | 2/1877 | Brown et al. |
| 238,946 | A | 3/1881 | McKitrick |
| 296,756 | A | 4/1884 | Kirkpatrick |
| 1,854,071 | A | 4/1932 | Schacht |
| 1,988,065 | A | 1/1935 | Wooddell |
| 2,027,087 | A | 1/1936 | Buckner |

(Continued)

FOREIGN PATENT DOCUMENTS

| CN | 1351922 | 6/2002 |
| CN | 1494984 | 5/2004 |

(Continued)

OTHER PUBLICATIONS

Colmonoy Technical Data Sheet; No. DSP-A; 1993.

(Continued)

*Primary Examiner* — Timothy V Eley
(74) *Attorney, Agent, or Firm* — Thorpe North & Western LLP

(57) ABSTRACT

A superabrasive tools having uniformly leveled superabrasive particles and associated methods are provided. In one aspect, for example, a superabrasive can include a metal matrix configured for bonding superabrasive particles and a plurality of superabrasive particles held in the metal matrix at specific positions according to a predetermined pattern, wherein tips of each of the plurality of the superabrasive particles protrude from the metal matrix to a uniform height.

15 Claims, 4 Drawing Sheets

Related U.S. Application Data continuation of application No. 11/818,894, filed on Jun. 14, 2007, now abandoned, which is a continuation of application No. 10/791,300, filed on Mar. 1, 2004, now Pat. No. 7,323,049, which is a continuation-in-part of application No. 10/259,168, filed on Sep. 27, 2002, now Pat. No. 7,124,753, which is a continuation-in-part of application No. 09/935,204, filed on Aug. 22, 2001, now Pat. No. 6,679,243, and a continuation-in-part of application No. 10/109,531, filed on Mar. 27, 2002, now Pat. No. 6,884,155, said application No. 09/935,204 is a continuation-in-part of application No. 08/835,117, filed on Apr. 4, 1997, now Pat. No. 6,039,641, and a continuation-in-part of application No. 09/399,573, filed on Sep. 20, 1999, now Pat. No. 6,826,498, which is a continuation-in-part of application No. 08/832,852, filed on Apr. 4, 1997, now abandoned, said application No. 10/109,531 is a continuation-in-part of application No. 09/558,582, filed on Apr. 26, 2000, now Pat. No. 6,368,198.

(56) References Cited

U.S. PATENT DOCUMENTS

| | | |
|---|---|---|
| 2,027,307 A | 1/1936 | Schacht |
| 2,033,991 A | 3/1936 | Melton |
| 2,035,521 A | 3/1936 | Benner |
| 2,075,354 A | 3/1937 | Monier |
| RE20,660 E | 2/1938 | Schacht |
| 2,184,348 A | 12/1939 | Kirchner |
| 2,187,624 A | 1/1940 | Melton |
| 2,194,253 A | 3/1940 | Benner |
| 2,268,663 A | 1/1942 | Kuzmick |
| 2,281,558 A | 5/1942 | Cross |
| 2,307,461 A | 1/1943 | Ogden |
| 2,318,570 A | 5/1943 | Carlton |
| 2,334,572 A | 11/1943 | Melton |
| 2,612,348 A | 9/1952 | Catallo |
| 2,725,693 A | 12/1955 | Smith |
| 2,811,960 A | 11/1957 | Fessel |
| 2,867,086 A | 1/1959 | Haley |
| 2,876,086 A | 3/1959 | Raymond |
| 2,947,608 A | 8/1960 | Hall |
| 2,652,951 A | 9/1960 | Simpson |
| 2,952,951 A | 9/1960 | Simpson |
| 3,067,551 A | 12/1962 | Maginnis |
| 3,121,981 A | 2/1964 | Hurst |
| 3,127,715 A | 4/1964 | Christensen |
| 3,146,560 A | 9/1964 | Hurst |
| 3,276,852 A | 10/1966 | Lemelson |
| 3,293,012 A | 12/1966 | Smiley |
| 3,372,010 A | 3/1968 | Parsons |
| 3,377,411 A | 4/1968 | Charvat |
| 3,416,560 A | 12/1968 | Bruno |
| 3,440,774 A | 4/1969 | Curn |
| 3,593,382 A | 7/1971 | Miller |
| 3,608,134 A | 9/1971 | Cook |
| 3,625,666 A | 12/1971 | James |
| 3,630,699 A | 12/1971 | Caitlin |
| 3,631,638 A | 1/1972 | Yoshikawa et al. |
| 3,664,662 A | 5/1972 | Linz |
| 3,706,650 A | 12/1972 | Eisner |
| 2,078,354 A | 4/1973 | Webster |
| 3,743,489 A | 7/1973 | Wentorf et al. |
| 3,767,371 A | 10/1973 | Wentorf et al. |
| 3,802,130 A | 4/1974 | Lindenbeck |
| 3,819,814 A | 6/1974 | Pope |
| 3,852,078 A | 12/1974 | Wakatsuki et al. |
| 3,894,673 A | 7/1975 | Lowder et al. |
| 3,905,571 A | 9/1975 | Lombardo |
| 3,982,358 A | 9/1976 | Fukuda |
| 4,018,576 A | 4/1977 | Lowder et al. |
| 4,028,576 A | 6/1977 | Wofsey |
| 4,078,906 A | 3/1978 | Green |
| 4,149,881 A | 4/1979 | D'Silva |
| 4,151,154 A | 4/1979 | Berger |
| 4,155,721 A | 5/1979 | Fletcher |
| 4,182,628 A | 1/1980 | D'Silva |
| 4,188,194 A | 2/1980 | Gorrigan |
| 4,201,601 A | 5/1980 | D'Silva |
| 4,211,294 A | 7/1980 | Multakh |
| 4,211,924 A | 7/1980 | Muller et al. |
| 4,224,380 A | 9/1980 | Bovenkerek et al. |
| 4,228,214 A | 10/1980 | Steigleman et al. |
| 4,229,186 A | 10/1980 | Wilson |
| 4,273,561 A | 6/1981 | Villalobos |
| 4,287,168 A | 9/1981 | Wentorf et al. |
| 4,289,503 A | 9/1981 | Corrigan |
| 4,341,532 A | 7/1982 | Oide |
| 4,355,489 A | 10/1982 | Heyer et al. |
| 4,405,411 A | 9/1983 | Inoue et al. |
| 4,481,016 A | 11/1984 | Campbell et al. |
| 4,525,179 A | 6/1985 | Gigl |
| 4,547,257 A | 10/1985 | Iizuka et al. |
| 4,551,195 A | 11/1985 | Iizuka et al. |
| 4,565,034 A | 1/1986 | Sekiya |
| 4,610,699 A | 9/1986 | Yazu et al. |
| 4,617,181 A | 10/1986 | Yazu et al. |
| 4,629,373 A | 12/1986 | Hall |
| 4,632,817 A | 12/1986 | Yazu et al. |
| 4,662,896 A | 5/1987 | Dennis |
| 4,669,522 A | 6/1987 | Griffin |
| 4,680,199 A | 7/1987 | Vontell et al. |
| 4,712,552 A | 12/1987 | Pangburn |
| 4,737,162 A | 4/1988 | Grazen |
| 4,749,514 A | 6/1988 | Murakami et al. |
| 4,770,907 A | 9/1988 | Kimura |
| 4,776,861 A | 10/1988 | Frushour |
| 4,780,274 A | 10/1988 | Barr |
| 4,797,241 A | 1/1989 | Peterson et al. |
| 4,828,582 A | 5/1989 | Frushour |
| 4,849,602 A | 7/1989 | Gardner |
| 4,863,573 A | 9/1989 | Moore et al. |
| 4,866,888 A | 9/1989 | Murai et al. |
| 4,883,500 A | 11/1989 | Deakins et al. |
| 4,908,046 A | 3/1990 | Wiand |
| 4,916,869 A | 4/1990 | Oliver |
| 4,923,490 A | 5/1990 | Johnson et al. |
| 4,925,457 A | 5/1990 | deKok et al. |
| 4,927,619 A | 5/1990 | Tsuji |
| 4,943,488 A | 7/1990 | Sung et al. |
| 4,945,686 A | 8/1990 | Wiand |
| 4,949,511 A | 8/1990 | Endo et al. |
| 4,954,139 A | 9/1990 | Cerutti |
| 4,968,326 A | 11/1990 | Wiand |
| 5,000,273 A | 3/1991 | Horton et al. |
| 5,011,513 A | 4/1991 | Zador et al. |
| 5,022,895 A | 6/1991 | Wiand |
| 5,024,680 A | 6/1991 | Chen et al. |
| 5,030,276 A | 7/1991 | Sung et al. |
| 5,037,451 A | 8/1991 | Burnand et al. |
| 5,043,120 A | 8/1991 | Corrigan |
| 5,049,165 A | 9/1991 | Tselesin |
| 5,092,082 A | 3/1992 | Padberg |
| 5,092,910 A | 3/1992 | deKok et al. |
| 5,116,568 A | 5/1992 | Sung |
| 5,131,924 A | 7/1992 | Wiand |
| 5,133,782 A | 7/1992 | Wiand |
| 5,137,543 A | 8/1992 | Heath et al. |
| 5,151,107 A | 9/1992 | Cho et al. |
| 5,164,247 A | 11/1992 | Solanki et al. |
| 5,176,155 A | 1/1993 | Rudolph, Jr. |
| 5,190,568 A | 3/1993 | Tselesin |
| 5,194,070 A | 3/1993 | Sumiya et al. |
| 5,194,071 A | 3/1993 | Corrigan et al. |
| 5,195,403 A | 3/1993 | Sani et al. |
| 5,195,404 A | 3/1993 | Notter et al. |
| 5,197,249 A | 3/1993 | Wiand |
| 5,203,881 A | 4/1993 | Wiand |
| 5,232,320 A | 8/1993 | Tank et al. |
| 5,243,790 A | 9/1993 | Gagne |

(56) References Cited

U.S. PATENT DOCUMENTS

| | | |
|---|---|---|
| 5,246,884 A | 9/1993 | Jaso |
| 5,247,765 A | 9/1993 | Quintana |
| 5,248,317 A | 9/1993 | Tank |
| 5,264,011 A | 11/1993 | Brown et al. |
| 5,266,236 A | 11/1993 | Bovenkerk |
| 5,271,547 A | 12/1993 | Carlson |
| 5,273,730 A | 12/1993 | Yoshida et al. |
| 5,295,402 A | 3/1994 | Bovenkerk |
| 5,314,513 A | 5/1994 | Miller |
| 5,328,548 A | 7/1994 | Tsuji et al. |
| 5,364,423 A | 11/1994 | Bigelow et al. |
| 5,374,293 A | 12/1994 | Takashita et al. |
| 5,380,390 A | 1/1995 | Tselesin |
| 5,443,032 A | 8/1995 | Vichr et al. |
| 5,453,106 A | 9/1995 | Roberts |
| 5,454,343 A | 10/1995 | Eun et al. |
| 5,458,754 A | 10/1995 | Sathrum et al. |
| 5,486,131 A | 1/1996 | Cesna et al. |
| 5,492,771 A | 2/1996 | Lowder et al. |
| 5,492,774 A | 2/1996 | Tateno et al. |
| 5,496,386 A | 3/1996 | Broberg et al. |
| 5,500,248 A | 3/1996 | Iacovangelo et al. |
| 5,505,272 A | 4/1996 | Clark |
| 5,518,443 A | 5/1996 | Fisher |
| 5,527,424 A | 6/1996 | Mullins |
| 5,536,202 A | 7/1996 | Appel et al. |
| 5,547,417 A | 8/1996 | Breivogel et al. |
| 5,551,959 A | 9/1996 | Martin et al. |
| 5,560,745 A | 10/1996 | Roberts |
| 5,560,754 A | 10/1996 | Johnson et al. |
| 5,609,286 A | 3/1997 | Anthon |
| 5,620,489 A | 4/1997 | Tselesin |
| 5,660,894 A | 8/1997 | Chen et al. |
| 5,669,943 A | 9/1997 | Horton et al. |
| 5,674,572 A | 10/1997 | Sarin et al. |
| 5,725,421 A | 3/1998 | Goers et al. |
| 5,746,931 A | 5/1998 | Graebner |
| RE35,812 E | 6/1998 | Oliver |
| 5,772,756 A | 6/1998 | Davies et al. |
| 5,776,214 A | 7/1998 | Wood |
| 5,779,743 A | 7/1998 | Wood |
| 5,791,975 A | 8/1998 | Cesna et al. |
| 5,801,073 A | 9/1998 | Robbins et al. |
| 5,816,891 A | 10/1998 | Woo |
| 5,820,450 A | 10/1998 | Calhoun |
| 5,833,519 A | 11/1998 | Moore |
| 5,840,090 A | 11/1998 | Ho et al. |
| 5,851,138 A | 12/1998 | Hempel, Jr. |
| 5,855,314 A | 1/1999 | Shiue et al. |
| 5,868,806 A | 2/1999 | Nishio et al. |
| 5,885,137 A | 3/1999 | Ploessl |
| 5,902,173 A | 5/1999 | Tanaka |
| 5,916,011 A | 6/1999 | Kim |
| 5,919,084 A | 7/1999 | Powell et al. |
| 5,921,856 A | 7/1999 | Zimmer |
| 5,924,917 A | 7/1999 | Benedict et al. |
| 5,961,373 A | 10/1999 | Lai |
| 5,975,988 A | 11/1999 | Christianson |
| 5,976,001 A | 11/1999 | Powell et al. |
| 5,976,205 A | 11/1999 | Andrews et al. |
| 5,980,852 A | 11/1999 | Gurns et al. |
| 5,980,982 A | 11/1999 | Degawa et al. |
| 5,985,228 A | 11/1999 | Corrigan et al. |
| 6,001,008 A | 12/1999 | Fujimori et al. |
| 6,001,174 A | 12/1999 | Fang |
| 6,024,824 A | 2/2000 | Krech |
| 6,027,659 A | 2/2000 | Billet |
| 6,030,595 A | 2/2000 | Sumiya et al. |
| 6,039,641 A | 3/2000 | Sung |
| 6,054,183 A | 4/2000 | Zimmer et al. |
| 6,093,280 A | 7/2000 | Kirchner et al. |
| 6,106,382 A | 8/2000 | Sakaguchi |
| 6,123,612 A | 9/2000 | Goers |
| 6,125,612 A | 10/2000 | Main |
| 6,159,087 A | 12/2000 | Briang et al. |
| 6,159,286 A | 12/2000 | Sung |
| 6,179,886 B1 | 1/2001 | Gordeev et al. |
| 6,190,240 B1 | 2/2001 | Kinoshita et al. |
| 6,193,770 B1 | 2/2001 | Sung |
| 6,196,911 B1 | 3/2001 | Preston et al. |
| 6,200,360 B1 | 3/2001 | Imai et al. |
| 6,206,942 B1 | 3/2001 | Wood et al. |
| 6,213,856 B1 | 4/2001 | Cho et al. |
| 6,217,413 B1 | 4/2001 | Christianson |
| 6,224,469 B1 | 5/2001 | Ohmori et al. |
| 6,258,138 B1 | 7/2001 | DeVoe et al. |
| 6,258,201 B1 | 7/2001 | Krech |
| 6,258,237 B1 | 7/2001 | Gal-Or et al. |
| 6,281,129 B1 | 8/2001 | Easter et al. |
| 6,284,556 B1 | 9/2001 | Wang et al. |
| 6,286,498 B1 | 9/2001 | Sung |
| 6,293,854 B1 | 9/2001 | Kimura et al. |
| 6,299,508 B1 | 10/2001 | Gagliardi et al. |
| 6,299,521 B1 | 10/2001 | Morimura et al. |
| 6,312,324 B1 | 11/2001 | Mitsui et al. |
| 6,319,108 B1 | 11/2001 | Adefris et al. |
| 6,325,709 B1 | 12/2001 | Nanda et al. |
| 6,346,202 B1 | 2/2002 | Molnar |
| 6,354,918 B1 | 3/2002 | Togawa et al. |
| 6,354,929 B1 | 3/2002 | Adefris et al. |
| 6,368,198 B1 | 4/2002 | Sung et al. |
| 6,371,838 B1 | 4/2002 | Holzapfel |
| 6,371,842 B1 | 4/2002 | Romero |
| 6,372,001 B1 | 4/2002 | Omar et al. |
| 6,394,886 B1 | 5/2002 | Chen et al. |
| 6,409,580 B1 | 6/2002 | Lougher et al. |
| 6,416,878 B2 | 7/2002 | An |
| 6,439,986 B1 | 8/2002 | Myoung et al. |
| 6,446,740 B2 | 9/2002 | Eyre |
| 6,458,018 B1 | 10/2002 | Goers et al. |
| 6,478,831 B2 | 11/2002 | Tselesin |
| 6,497,853 B1 | 12/2002 | Davies et al. |
| 6,544,599 B1 | 4/2003 | Brown et al. |
| 6,551,176 B1 | 4/2003 | Garretson |
| 6,605,798 B1 | 8/2003 | Cullen |
| 6,607,423 B1 | 8/2003 | Areayan et al. |
| 6,616,725 B2 | 9/2003 | Cho et al. |
| 6,616,752 B1 | 9/2003 | Basura et al. |
| 6,626,167 B2 | 9/2003 | Kim et al. |
| 6,627,168 B1 | 9/2003 | Ohtsubo et al. |
| 6,629,884 B1 | 10/2003 | Goers |
| 6,646,725 B1 | 11/2003 | Eichinger et al. |
| 6,672,943 B2 | 1/2004 | Vogtmann |
| 6,679,243 B2 | 1/2004 | Sung |
| 6,692,547 B2 | 2/2004 | Kim |
| 6,694,847 B2 | 2/2004 | Hiroyasu et al. |
| 6,722,952 B2 | 4/2004 | Goers et al. |
| 6,749,485 B1 | 6/2004 | James et al. |
| 6,755,720 B1 | 6/2004 | Ishizaki et al. |
| 6,769,969 B1 | 8/2004 | Duescher |
| 6,790,126 B2 | 9/2004 | Wood et al. |
| 6,818,029 B2 | 11/2004 | Myoung et al. |
| 6,824,455 B2 | 11/2004 | Osterheld et al. |
| 6,835,365 B1 | 12/2004 | Davies et al. |
| 6,837,979 B2 | 1/2005 | Uzho et al. |
| 6,884,155 B2 | 4/2005 | Sung et al. |
| 6,899,592 B1 | 5/2005 | Kojima |
| 6,905,571 B2 | 6/2005 | Sakuma et al. |
| 6,935,365 B2 | 8/2005 | Schuster et al. |
| 6,945,857 B1 | 9/2005 | Doan et al. |
| 6,979,357 B2 | 12/2005 | Fries et al. |
| 7,021,995 B2 | 4/2006 | Toge et al. |
| 7,033,408 B2 | 4/2006 | Fries et al. |
| 7,044,990 B2 | 5/2006 | Ishizaki et al. |
| 7,066,795 B2 | 6/2006 | Balagani et al. |
| 7,067,903 B2 | 6/2006 | Tachibana et al. |
| 7,124,753 B2 | 10/2006 | Sung |
| 7,150,677 B2 | 12/2006 | Yamashita et al. |
| 7,198,553 B2 | 4/2007 | Goers |
| 7,201,645 B2 | 4/2007 | Sung |
| 7,247,577 B2 | 7/2007 | Palmgren et al. |
| 7,258,708 B2 | 8/2007 | Sung |
| 7,261,621 B2 | 8/2007 | Moon et al. |
| 7,323,049 B2 | 1/2008 | Sung |

(56) References Cited

U.S. PATENT DOCUMENTS

| | | | |
|---|---|---|---|
| 7,368,013 B2 | 5/2008 | Sung | |
| 7,384,436 B2 | 6/2008 | Sung | |
| 7,404,857 B2 | 7/2008 | Sung | |
| 7,465,217 B2 | 12/2008 | Kinoshita et al. | |
| 7,494,404 B2 | 2/2009 | Sung | |
| 7,507,267 B2 | 3/2009 | Hall et al. | |
| 7,585,366 B2 | 9/2009 | Sung | |
| 7,641,538 B2 | 1/2010 | Goers | |
| 7,651,368 B2 | 1/2010 | Kendall et al. | |
| 7,651,386 B2 | 1/2010 | Sung | |
| 7,658,666 B2 | 2/2010 | Sung | |
| 7,690,971 B2 | 4/2010 | Sung | |
| 7,762,872 B2 | 7/2010 | Sung | |
| 7,791,188 B2 | 9/2010 | Sung | |
| 7,840,305 B2 | 11/2010 | Behr et al. | |
| 7,954,483 B2 | 6/2011 | Kim et al. | |
| 8,104,464 B2 | 1/2012 | Sung | |
| 8,377,158 B2 | 2/2013 | Palmgren et al. | |
| 8,393,934 B2 | 3/2013 | Sung | |
| 8,545,583 B2 | 10/2013 | Duescher | |
| 2001/0003884 A1 | 6/2001 | Wei et al. | |
| 2001/0009844 A1 | 7/2001 | Cho et al. | |
| 2001/0046835 A1 | 11/2001 | Wielonski et al. | |
| 2002/0014041 A1 | 2/2002 | Baldonai et al. | |
| 2002/0042200 A1 | 4/2002 | Fawcett | |
| 2002/0127962 A1 | 9/2002 | Cho et al. | |
| 2002/0139680 A1 | 10/2002 | George | |
| 2002/0164928 A1 | 11/2002 | Tolles | |
| 2002/0173234 A1 | 11/2002 | Sung et al. | |
| 2002/0182401 A1 | 12/2002 | Lawing | |
| 2003/0054746 A1 | 3/2003 | Nussbaumer | |
| 2003/0084894 A1 | 5/2003 | Sung | |
| 2003/0092357 A1 | 5/2003 | Yoon et al. | |
| 2003/0114094 A1 | 6/2003 | Myoung et al. | |
| 2003/0207659 A1 | 11/2003 | Annen et al. | |
| 2004/0009742 A1 | 1/2004 | Lin et al. | |
| 2004/0023610 A1 | 2/2004 | Hu et al. | |
| 2004/0060243 A1 | 4/2004 | Fries et al. | |
| 2004/0079033 A1 | 4/2004 | Long | |
| 2004/0091627 A1 | 5/2004 | Ohara et al. | |
| 2004/0107648 A1 | 6/2004 | Sung | |
| 2004/0180617 A1 | 9/2004 | Goers | |
| 2004/0203325 A1 | 10/2004 | Donohue | |
| 2004/0235406 A1 | 11/2004 | Duescher | |
| 2004/0238946 A1 | 12/2004 | Tachibana et al. | |
| 2005/0032462 A1 | 2/2005 | Gagliardi et al. | |
| 2005/0032469 A1 | 2/2005 | Duescher | |
| 2005/0060941 A1 | 3/2005 | Provow | |
| 2005/0095959 A1 | 5/2005 | Sung | |
| 2005/0118939 A1 | 6/2005 | Duescher | |
| 2005/0215188 A1 | 9/2005 | Toge et al. | |
| 2005/0227590 A1 | 10/2005 | Sung | |
| 2005/0260939 A1 | 11/2005 | Andrews et al. | |
| 2006/0073774 A1 | 4/2006 | Sung | |
| 2006/0079160 A1 | 4/2006 | Balagani et al. | |
| 2006/0079162 A1 | 4/2006 | Yamashita et al. | |
| 2006/0128288 A1 | 6/2006 | An et al. | |
| 2006/0135050 A1 | 6/2006 | Petersen et al. | |
| 2006/0143991 A1 | 7/2006 | Sung | |
| 2006/0213128 A1 | 9/2006 | Sung | |
| 2006/0254154 A1 | 11/2006 | Haung et al. | |
| 2006/0258276 A1 | 11/2006 | Sung | |
| 2007/0051354 A1 | 3/2007 | Sung | |
| 2007/0051355 A1 | 3/2007 | Sung | |
| 2007/0060026 A1 | 3/2007 | Sung | |
| 2007/0066194 A1 | 3/2007 | Wielonski et al. | |
| 2007/0093181 A1 | 4/2007 | Lugg et al. | |
| 2007/0128994 A1 | 6/2007 | Sung | |
| 2007/0155298 A1 | 7/2007 | Sung | |
| 2007/0232074 A1 | 10/2007 | Ravi et al. | |
| 2007/0249270 A1 | 10/2007 | Sung | |
| 2007/0254566 A1 | 11/2007 | Sung | |
| 2007/0264918 A1 | 11/2007 | Sung | |
| 2007/0266639 A1 | 11/2007 | Sung | |
| 2007/0295267 A1 | 12/2007 | Sung | |
| 2008/0014845 A1 | 1/2008 | Yimaz et al. | |
| 2008/0076338 A1 | 3/2008 | Andrews et al. | |
| 2008/0096479 A1 | 4/2008 | Sung | |
| 2008/0153398 A1 | 6/2008 | Sung | |
| 2008/0171503 A1 | 7/2008 | Sung | |
| 2008/0271384 A1 | 11/2008 | Puthanangady et al. | |
| 2008/0292869 A1 | 11/2008 | Sung | |
| 2008/0296756 A1 | 12/2008 | Koch et al. | |
| 2009/0068937 A1 | 3/2009 | Sung | |
| 2009/0073774 A1 | 3/2009 | Horesh et al. | |
| 2009/0093195 A1 | 4/2009 | Sung | |
| 2009/0094902 A1 | 4/2009 | Hou | |
| 2009/0123705 A1 | 5/2009 | Sung | |
| 2009/0145045 A1 | 6/2009 | Sung | |
| 2009/0215363 A1 | 8/2009 | Sung | |
| 2009/0283089 A1 | 11/2009 | Sung | |
| 2010/0015898 A1 | 1/2010 | An et al. | |
| 2010/0022174 A1 | 1/2010 | Chou et al. | |
| 2010/0139174 A1 | 6/2010 | Sung | |
| 2010/0186479 A1 | 7/2010 | Borucki et al. | |
| 2010/0203811 A1 | 8/2010 | Philipossian et al. | |
| 2010/0221990 A1 | 9/2010 | Sung | |
| 2010/0248595 A1 | 9/2010 | Dinh-Ngoc | |
| 2010/0248596 A1 | 9/2010 | Sung | |
| 2010/0261419 A1 | 10/2010 | Sung | |
| 2011/0076925 A1 | 3/2011 | Sung | |
| 2011/0104989 A1 | 5/2011 | Boutaghou et al. | |
| 2011/0192652 A1 | 8/2011 | Shen et al. | |
| 2011/0212670 A1 | 9/2011 | Sung | |
| 2011/0252710 A1 | 10/2011 | Hall et al. | |
| 2011/0275288 A1 | 11/2011 | Sung | |
| 2011/0293905 A1 | 12/2011 | Sung | |
| 2011/0296766 A1 | 12/2011 | Sung | |
| 2012/0192499 A1 | 8/2012 | Sung | |
| 2012/0241943 A1 | 9/2012 | Sung | |
| 2012/0244790 A1 | 9/2012 | Sung | |
| 2012/0260582 A1 | 10/2012 | Sung | |
| 2012/0302146 A1 | 11/2012 | Sung | |
| 2013/0225052 A1 | 8/2013 | Song et al. | |

FOREIGN PATENT DOCUMENTS

| | | |
|---|---|---|
| EP | 0712941 | 5/1966 |
| EP | 0238434 | 3/1987 |
| EP | 0280657 | 8/1988 |
| EP | 0331344 | 2/1989 |
| EP | 0264674 | 9/1995 |
| EP | 1075898 | 2/2001 |
| GB | 2239011 | 6/1991 |
| GB | 2366804 | 3/2002 |
| JP | 06182184 | 4/1994 |
| JP | 10128654 | 5/1998 |
| JP | 10180618 | 7/1998 |
| JP | 11048122 | 2/1999 |
| JP | 11077536 | 3/1999 |
| JP | 200167774 | 6/2000 |
| JP | 2000343436 | 12/2000 |
| JP | 2003/071718 | 3/2003 |
| JP | 2003/0717189 | 3/2003 |
| JP | 2004/025401 | 1/2004 |
| JP | 2007-044823 | 2/2007 |
| KR | 10-2002-0036138 A | 5/2002 |
| KR | 200339181 | 1/2004 |
| KR | 10-2007-0063569 A | 6/2007 |
| WO | WO94/27883 | 12/1994 |
| WO | WO95/27596 | 10/1995 |
| WO | WO 95/31006 | 11/1995 |
| WO | WO96/06732 | 3/1996 |
| WO | WO98/10897 | 3/1998 |
| WO | WO98/45091 | 3/1998 |
| WO | WO98/51448 | 3/1998 |
| WO | WO98/45092 | 10/1998 |
| WO | WO02/31078 | 4/2002 |
| WO | WO2004/094106 | 11/2004 |
| WO | WO2006/039413 | 4/2006 |
| WO | WO2006/124792 | 11/2006 |
| WO | WO2007/032946 | 3/2007 |
| WO | WO2008/063599 | 5/2008 |

(56) References Cited

FOREIGN PATENT DOCUMENTS

| WO | WO 2009/043058 | 4/2009 |
|---|---|---|
| WO | WO 2009/064677 | 5/2009 |
| WO | WO 2012/040374 A2 | 3/2012 |

OTHER PUBLICATIONS

Endecott's Specifications; 2004.
Kennametal Specification for DMHPM002 Hot Press Matrix N-50 Dec. 6, 2001.
Material Safety Data Sheet (MSDS), Wall Colmonoy Corporation; prepared Jul. 20, 1989.
Material Safety Data Sheet MSDS); Kennametal; issued Jun. 11, 2004.
Sung et al.; The Eastern Wind of Diamond Synthesis; New Diamond and Frontier Carpon Technology; 2003; pp. 47-61; vol. 13, No. 1.
Sung et al; Mechanism of the Solvent-Assisted Graphite to Diamond Transition Under High Pressure: Implications for the Selection of Catalysts, High Temperatures-High Pressure; 1995/1996; pp. 523-546; vol. 27/28.
Syndite, CTM302; Announcement, Elementsix Advancing Diamond; Jan. 14, 2003; http://www.e6.com/en/resourches/announcementsheets/CTM302.pdf; as accessed on Dec. 16, 2008.
Syndite, Elementsix Advancing Diamond; 2 pages.
U.S. Appl. No. 08/832,852; filed Apr. 4, 1997; Chien-Min Sung.
U.S. Appl. No. 09/447,620; filed Nov. 22, 1999; Chien-Min Sung.
Yasinaga et al; Advances in Abrasive Technology, III; Soc. of Grinding Engineers (SGE) in Japan; 2000.
U.S. Appl. No. 11/512,755, filed Aug. 29, 2006; Chien-Min Sung.
U.S. Appl. No. 13/239,189, filed Sep. 21, 2011; Chien-Min Sung; office action dated Dec. 21, 2012.
U.S. Appl. No. 12/255,823, filed Oct. 22, 2008; Chien-Min Sung; notice of allowance dated Dec. 26, 2012.
PCT/US2012/039199; filed May 23, 2012; Chien-Min Sung; International Search Report dated Dec. 18, 2012.
U.S. Appl. No. 13/362,917; filed Jan. 13, 2012; Chien-Min Sung; office action dated Dec. 31, 2012.
U.S. Appl. No. 12/168,110; filed Jul. 5, 2008; Chien-Min Sung; notice of allowance dated Jan. 18, 2013.
U.S. Appl. No. 12/059,422; filed Mar. 31, 2008; Chien-Min Sung; office action dated Jan. 24, 2013.
PCT Application PCT/US2011/052627; filed Sep. 21, 2011; Chien-Min Sung; International Search Report mailed May 11, 2012.
U.S. Appl. No. 13/362,917, filed Jan. 31, 2012; Chien-Min Sung; office action dated Jun. 14, 2012.
U.S. Appl. No. 12/168,110, filed Jul. 5, 2008; Chien-Min Sung; office action dated May 14, 2012.
U.S. Appl. No. 12/059,422, filed Mar. 30, 2008; Chien-Min Sung; office action dated Aug. 22, 2012.
U.S. Appl. No. 12/255,823, filed Oct. 21, 2008; Chien-Min Sung; notice of allowance dated Sep. 21, 2012.
U.S. Appl. No. 12/168,110, filed Jul. 5, 2008; Chien-Min Sung; notice of allowance dated Sep. 28, 2012.
Implications for the Selection of Catalysts, High Temperatures-High Pressure; 1995/1996; pp. 523-546; vol. 27/28.
Syndire; Elementssix Advancing Diamond; 2 pages; www.c6.com.
PCT Application PCT/US2007/024165; filed Nov. 16, 2007; Chien-Min Sung; International Search report mailed May 23, 2011.
PCT Application PCT/US2011/052626; filing date Sep. 21, 2011; Chien-Min Sung; International Search Report mailed May 2, 2012.
PCT Application PCT/US2013/042538; filing date May 23, 2013; Chien-Min Sung; International Search Report mailed Aug. 27, 2013.
U.S. Appl. No. 12/168,110, filed Jul. 5, 2008; Chien-Min Sung; office action issued May 14, 2012.
U.S. Appl. No. 12/255,823, filed Oct. 22, 2005; Chien-Min Sung; office action issued Mar. 7, 2012.
U.S. Appl. 12/267,172, filed Nov. 7, 2008; Chien-Min Sung; office action issued Jan. 3, 2012.
U.S. Appl. No. 12/267,172, filed Jan. 31, 2012; Chien-Min Sung; office action issued Jul. 9, 2012.
U.S. Appl. No. 12/715,583, filed Mar. 2, 2010; Chien-Min Sung; office action issued Mar. 21, 2012.
U.S. Appl. No. 12/362,917, filed Jan. 31, 2012; Chien-Min Sung; office action dated Apr. 10, 2013.
U.S. Appl. No. 12/715,583, filed Mar. 2, 2010; Chien-Min Sung; office action issued Aug. 9, 2012.
U.S. Appl. No. 12/715,583, filed Mar. 2, 2010; Chien-Min Sung; office action issued Oct. 25, 2011.
U.S. Appl. No. 12/726,786, filed Mar. 18, 2010; Chien-Min Sung; office action dated Mar. 19, 2013.
U.S. Appl. No. 12/328,338, filed Dec. 4, 2008; Chien-Min Sung; Office action issued May 10, 2011.
U.S. Appl. No. 13/021,350, filed Feb. 4, 2011; Chien-Min Sung; office action issued Aug. 31, 2011.
U.S. Appl. No. 13/021,350, filed Feb. 4, 2011; Chien-Min Sung; office action issued Feb. 7, 2012.
U.S. Appl. No. 13/021,350, filed Feb. 4, 2011; Chien-Min Sung; office action dated Mar. 20, 2013.
U.S. Appl. 13/113,779, filed May 23, 2011; Chien-Min Sung; office action dated Nov. 12, 2013.
U.S. Appl. No. 13/239,198, filed Sep. 21, 2011; Chien-Min Sung; office action dated Jul. 23, 2013.
U.S. Appl. No. 13/362,917, filed Jan. 31, 2012; Chien-Min Sung; office action dated Apr. 10, 2013.
U.S. Appl. No. 13/153,176, filed Jun. 3, 2011; Chien-Min Sung; office action dated Dec. 6, 2013.
U.S. Appl. No. 13/479,148, filed May 23, 2012; Chien-Min Sung; office action dated May 15, 2014.
U.S. Appl. No. 12/715,583, filed Mar. 2, 2010; Chien-Min Sung; notice of allowance dated Dec. 7, 2012.
U.S. Appl. No. 12/267,172, filed Nov. 7, 2008; Chien-Min Sung; notice of allowance dated Jan. 7, 2013.
U.S. Appl. No. 12/726, 786, filed Mar. 18, 2010; Chien-Min Sung; notice of allowance mailed Sep. 4, 2013.
U.S. Appl. 13/239,189, filed Sep. 21, 2011; Chien-Min Sung; notice of allowance dated May 3, 2013.
U.S. Appl. No. 13/239,198, filed Sep. 21, 2011; Chien-Min Sung; notice of allowance mailed Mar. 4, 2014.
U.S. Appl. No. 13/794,164, filed Mar. 11, 2013; Chien-Min Sung; office action dated Jul. 16, 2014.
U.S. Appl. No. 13/407,634, filed Feb. 28, 2012; Chien-Min Sung; office action dated Jun. 13, 2014.
U.S. Appl. No. 13/644,790, filed Oct. 4, 2012; Chien-Min Sung; office action dated Jun. 17, 2014.
U.S. Appl. No. 13/416,201, filed Mar. 9, 2012; Chien-Min Sung; office action dated Jun. 18, 2014.
U.S. Appl. 13/153,176, filed Jun. 3, 2011; Chien-Min Sung; office action dated Jul. 1, 2014.
U.S. Appl. No. 13/802,112, filed Mar. 13, 2013; Chien-Min Sung; office action dated Nov. 6, 2014.
U.S. Appl. No. 13/479,148, filed May 23, 2012; Chien-Min Sung; Notice of Allowance mailed Dec. 9, 2014.
U.S. Appl. No. 13/644,790, filed Oct. 4, 2012; Chien-Min Sung office action dated Dec. 24, 2014.
U.S. Appl. No. 13/153,176, filed Jun. 3, 2011; Chien-Min Sung; office action dated Oct. 10, 2014.
U.S. Appl. 13/407,634, filed Feb. 28, 2012; Chien-Min Sung; office action dated Oct. 29, 2014.
U.S. Appl. No. 13/479,148, filed May 23, 2012; Chien-Min Sung; Notice of Allowance mailed Jan. 12, 2015.
U.S. Appl. No. 13/416,201, filed Mar. 9, 2012; Chien-Min Sung; office action dated Jan. 22, 2015.
U.S. Appl. No. 13/153,176, filed Jun. 3, 2011; Chien-Min Sung; office action dated Feb. 10, 2015.
U.S. Appl. No. 13/794,164, filed Mar. 11, 2013; Chiem-Min Sung; Notice of Allowance mailed Feb. 13, 2015.
U.S. Appl. No. 13/633,082, Filed date Oct. 1, 2012; Chien-Min Sung; Office Action dated Feb. 26, 2015.
U.S. Appl. No. 13/407,634, Filed date Feb. 28, 2012; Chien-Min Sung; Office Action dated Mar. 5, 2015.

(56) References Cited

OTHER PUBLICATIONS

U.S. Appl. No. 13/802,112, filed Mar. 13, 2013; Chien-Min Sung; Notice of Allowance mailed May 15, 2015.
U.S. Appl. No. 13/416,201, filed Mar. 9, 2012; Chien-Min Sung; Office Action dated May 15, 2015.
U.S. Appl. No. 13/644,790, filed Oct. 4, 2012; Chien-Min Sung; Notice of Allowance mailed Jun. 8, 2015.
U.S. Appl. No. 14/223,810, filed Mar. 24, 2014; Chien-Min Sung; Office Action dated Oct. 8, 2015.
U.S. Appl. No. 14/120,976, filed Jul. 15, 2014; Chien-Min Sung; Office Action dated Oct. 15, 2015.
U.S. Appl. No. 13/153,176, filed Jun. 3, 2011; Chien-Min Sung; Office Action dated Aug. 13, 2015.
U.S. Appl. No. 13/633,082, filed Oct. 1, 2012; Chien-Min Sung; Notice of Allowance mailed Aug. 19, 2015.
U.S. Appl. No. 13/407,634, filed Feb. 28, 2012; Chien-Min Sung; Notice of Allowance mailed Sep. 3, 2015.

SUPERBRASVIE TOOLS CONTAINING UNIFORMLY LEVELED SUPERABRASIVE PARTICLES AND ASSOCIATED METHODS

PRIORITY DATA

This application is a continuation of U.S. patent application Ser. No. 12/463,897, filed on May 11, 2009, now issued as U.S. Pat. No. 8,104,464, which is a continuation of U.S. patent application Ser. No. 11/818,894, filed on Jun. 14, 2007, now abandoned, which is a continuation of U.S. patent application Ser. No. 10/791,300, filed Mar. 1, 2004, now issued as U.S. Pat. No. 7,323,049, which is a continuation-in-part of U.S. patent application Ser. No. 10/259,168, filed Sep. 27, 2002, now issued as U.S. Pat. No. 7,124,753, which is a continuation-in-part of U.S. patent application Ser. No. 09/935,204, filed Aug. 22, 2001, now issued as U.S. Pat. No. 6,679,243, and of U.S. patent application Ser. No. 10/109,531, filed Mar. 27, 2002, now issued as U.S. Pat. No. 6,884,155. U.S. Pat. No. 6,679,243 is a continuation-in-part of U.S. patent application Ser. No. 08/835,117, filed on Apr. 4, 1997, now issued as U.S. Pat. No. 6,039,641 and a continuation-in-part of U.S. patent application Ser. No. 09/399,573, filed Sep. 20, 1999, now issued as U.S. Pat. No. 6,286,498, which is a continuation-in-part of U.S. patent application Ser. No. 08/832,852, filed Apr. 4, 1997, now abandoned. U.S. Pat. No. 6,884,155 is a continuation-in-part of U.S. patent application Ser. No. 09/558,582, filed Apr. 26, 2000, now issued as U.S. Pat. No. 6,368,198, which is a continuation-in-part of U.S. patent application Ser. No. 09/447,620, filed Nov. 22, 1999, now abandoned, all of which are incorporated herein by reference.

BACKGROUND OF THE INVENTION

Diamonds and cubic boron nitride (CBN) have been widely used as superabrasives on saws, drills, and other tools which utilize the superabrasive to cut, form or polish other hard materials. In 1996, the total value of superabrasive tools consumed was over 5 billion dollars (U.S.). It has been estimated that more than half of the superabrasive tools were consumed in sawing applications such as cutting stones, concretes, asphalts, etc.

Diamond tools are particularly indispensable for applications where other tools lack the strength and durability to be practical substitutes. For example, in the stone industry where rocks are cut, or sawed, diamond saws are the type that are sufficiently hard and durable to do the cutting. If superabrasives were not used, many such industries would be economically infeasible. Likewise, in the precision grinding industry, superabrasive tools, due to their superior wear resistance, are uniquely capable of developing the tight tolerances required, while simultaneously withstanding wear sufficiently to be practical.

Despite the tremendous improvements which diamond and cubic boron nitride have provided for cutting, drilling and grinding tools, there are still several disadvantages which, if overcome, would greatly improve performance of the tools, and/or reduce their cost. For example, the abrasive diamond or cubic boron nitride particles are not distributed uniformly in the matrix that holds them in place. As a result, the abrasive particles are not positioned to maximize efficiency for cutting, drilling, etc.

The distance between diamond or CBN abrasive particles determines the work load each particle will perform. Improper spacing of the diamond or CBN abrasive particles typically leads to premature failure of the abrasive surface or structure. Thus, if the diamond/CBN abrasive particles are too close to one another, some of the particles are redundant and provide little or no assistance in cutting or grinding. In addition, excess particles add to the expense of production due the high cost of diamond and cubic boron nitride. Moreover, these non-performing diamond or CBN particles can block the passage of debris, thereby reducing the cutting efficiency. Thus, having abrasive particles disposed too close to one another adds to the cost, while decreasing the useful life of the tool.

On the other hand, if abrasive particles are separated too far, the work load (e.g., the impact force exerted by the work piece) for each particle becomes excessive. The sparsely distributed diamond or CBN abrasive particles may be crushed, or even dislodged from the matrix into which they are disposed. The damaged or missing abrasive particles are unable to fully assist in the work load. Thus, the work load is transferred to the surviving abrasive particles. The failure of each abrasive particle causes a chain reaction which soon renders the tool ineffective to cut, drill, grind, etc.

A typical superabrasive tool, such as a diamond saw blade, is manufactured by mixing diamond particles (e.g., 40/50 U.S. mesh saw grit) with a suitable matrix (bond) powder (e.g., cobalt powder of 1.5 micrometer in size). The mixture is then compressed in a mold to form the right shape (e.g., a saw segment). The "green" form is then consolidated by sintering at a temperature between 700-1200° C. to form a single body with a plurality of superabrasive particles disposed therein. Finally, the consolidated body is attached (e.g., by brazing) to a tool body; such as the round blade of a saw, to form the final product.

Different applications, however, require different combinations of diamond (or cubic boron nitride) and matrix powder. For example, for drilling and sawing applications, a large sized (20 to 60 U.S. mesh) diamond grit is mixed with a metal powder. The metal powder is typically selected from cobalt, nickel, iron, copper, bronze, alloys thereof, and/or mixtures thereof. For grinding applications, a small sized (60/400 U.S. mesh) diamond grit (or cubic boron nitride) is mixed with either metal (typically bronze), ceramic/glass (typically a mixture of oxides of sodium, potassium, silicon, and aluminum) or resin (typically phenolic, or polyemide).

Because diamond or cubic boron nitride is much larger than the matrix powder (300 times in the above example for making saw segments), and it is much lighter than the latter (about ⅓ in density for making saw segments), it is very difficult to mix the two to achieve uniformity. Moreover, even when the mixing is thorough, diamond particles can still segregate from metal powder in the subsequent treatments such as pouring the mixture into a mold, or when the mixture is subjected to vibration. The distribution problem is particularly troublesome for making diamond tools when diamond is mixed in the metal matrix. Thus, finding a method for increasing the performance of the diamond or CBN superabrasive material, and/or decreasing the amount of the abrasive which is needed, is highly desirable. Such has been accomplished by the invention set forth herein. The invention is particularly effective and useful for diamond saws, the largest value category of all superabrasive tools, although it is applicable to all abrasive tools.

Over the decades, there have been numerous attempts to solve the diamond or CBN distribution problems. Unfortunately, none of the attempted methods have proven effective and, as of today, the distribution of diamond or CBN particles in superabrasive tools is still random and irregular, except for some special cases such as for drillers or dressers, where large diamond particles are individually set by hand in the surface to provide a single layer.

One method used in an attempt to make the diamond distribution uniform is to wrap diamond particles with a thick coating of matrix powder. The concentration of diamond particles in each diamond tool is tailored for a particular application. The concentration determines the average distance between diamond particles. For example, the concentration of a typical saw segment is 25 (100 means 25% by volume) or 6.25% by volume. Such a concentration makes the average diamond to diamond distance 2.5 times the particle size. Thus, if one coats the diamond and mixes the coated particles together, the distribution of diamond would be controlled by the thickness of coating and may become relatively uniform. Additional metal powder may be added as an interstitial filler between these coated particles to increase the packing efficiency so the consolidation of the matrix powder in subsequent sintering would be easier. Although the above-described coating metal has certain merit, in practice, uniformity of coating is very difficult to achieve.

There is yet another limitation associated with the current methods of coating diamond grits. Many times a metal bond diamond tool requires different sizes of diamond grits and/or different diamond concentrations to be disposed at different parts of the same diamond tool. For example, saw segments tend to wear faster on the edge or front than the middle. Therefore, higher concentrations are preferred in these locations to prevent uneven wear and thus premature failure of the saw segment. These higher concentration (known as "sandwich" segments) are difficult to fabricate by mixing coated diamond with metal powder to achieve a controlled distribution of the diamond particles in the segment. Thus, despite the known advantages of having varied diamond grit sizes and concentration levels, such configurations are seldom used because of the lack of a practical method of making thereof.

In summary, current arts are incapable of efficiently controlling the uniformity of diamond or CBN distribution in cutting tools. Likewise, the current methods are inadequate to provide effective control of size variations and/or concentration variations on different parts of the same tool. Moreover, even when the distribution is made relatively uniform, current arts cannot tailor the pattern of the distribution to overcome or compensate for typical wear patterns for the abrasive material, when used for a particular purpose. By resolving these problems, the performance of a diamond and other superabrasive tools can be effectively optimized.

This invention provides significant improvements to overcome the deficiencies. discussed above by eliminating random distribution of superabrasive particles. This invention provides a superabrasive in which every diamond or CBN particle is positively planted at desired positions to achieve the maximum utility of the superabrasive particles. Hence, the performance of the superabrasive tool can be optimized.

By making the distribution of diamond or CBN particles, uniform or in a predetermined pattern and tailored to the particular applications of the tool, the work load can be evenly distributed to each particle. As a result, the superabrasive tool will cut faster and its working life will be extended for a considerable amount of time. Moreover, by eliminating the redundancy, less superabrasive may be needed, thereby reducing the cost of the tool manufacture. Additionally, if the distribution can be controlled, superabrasive tools utilizing diamond or cubic boron nitride can be configured to provide the most efficient tool possible.

The present invention resolves these problems and provides the advantages set forth above by providing a method for forming such metal bond diamond or CBN tools wherein the superabrasive grit distribution can be controlled to provide either uniform grit placement, or to provide a grit placement pattern which is tailored to the particular wear characteristics of the tool. Because the distribution of the diamond/CBN grits is controlled, the diamond/CBN grits can be disposed in patterns which provide for relatively even wear of the abrasive surface, rather than having portions of the surface wear prematurely. As each superabrasive grit is more fully utilized, there is no need for redundant superabrasive grits as a backup. Therefore, the cost of making the metal bond diamond or CBN tools can be reduced by reducing the overall amount of superabrasives.

SUMMARY OF THE INVENTION

It is an object of the present invention to provide a method for forming metal bond superabrasive tools, wherein the distribution of the superabrasive grit is monitored to provide improved cutting, sawing, or grinding, characteristics without requiring an increase in the amount of superabrasive grit used to form the tool.

It is another object of the invention to provide such a method wherein the distribution of the superabrasive grit is controlled to promote more even wear of the tool surface, and thereby lengthen the useful life of the tool.

It is yet another object of the present invention to provide tools with the minimal amount of superabrasive required to perform the task for which the tool is designed, thereby reducing the cost of making the tool.

The above and other objects of the invention are achieved by providing metal bond superabrasive tools wherein the superabrasives, such as diamond or CBN grits, are distributed in a metal matrix in a uniform or a predetermined pattern. While the process of distributing diamond or cubic boron nitride grits in a metal matrix has always been viewed as a complex one and needs to be improved, the present invention provides such an improved process that is easy to manipulate and control, and which can be repeated with a high degree of accuracy. More specifically, the desire distribution of superabrasive particles in a metal matrix body is achieved by assembling layers of metal matrix material that contain a controlled, predetermined pattern of superabrasive particles. Each layer is formed by distributing the superabrasive grit into a layer of bonding metal matrix in a predetermined pattern. Each layer, which is assembled to form a superabrasive impregnated segment, can be of the same distribution pattern and concentration, or the distribution pattern and/or concentration may vary from layer to layer.

In accordance with one aspect of the present invention, each layer is assembled by disposing a layer of metal matrix so that it may be used as a precursor. The superabrasive grit is then disposed in the metal matrix layer in a desired pattern. After the diamond particles are planted into the metal matrix layer in a predetermined pattern, the process is repeated until a desired number of layers have been formed. These layers are then assembled to form the desired three-dimensional body. Subsequently the diamond tool is consolidated (e.g., by sintering or infiltration as described above) to form the final product.

By assembling layers of metal matrix impregnated with superabrasives in a predetermined pattern and concentration into a three dimensional body, the present invention not only provides the desirable diamond/CBN distribution pattern in the tool body, but also provides the flexibility for possible manipulation of diamond concentration at different parts of the same tool body. Thus, for example, diamond particles can be disposed in denser concentrations in some layers than others, and the layers with the greater diamond/CBN concentrations can be disposed within the three-dimensional structure created in such a manner as to prevent the uneven wear patterns that are typical in many prior art diamond tools.

In accordance with another aspect of the present invention each metal matrix layer impregnated with superabrasives is created by first forming a thin layer of metal bonding matrix. A template is then disposed on the metal bonding matrix. The template has a plurality of apertures formed therein which are sized to receive a superabrasive grit of a particular size, with one particle being disposed in each aperture. As the superabrasive grit fills the apertures, the grits may be subjected to pressure or otherwise moved into the metal bonding matrix. Because of the template, the superabrasive which enters the metal bonding matrix is disposed in a predetermined pattern. A plurality of such metal matrix layers impregnated with superabrasives can then be bonded together and attached to the tool by brazing, or some other process, to provide a three-dimensional superabrasive cutting or sawing member on the tool.

In accordance with another aspect of the present invention, the pattern in which the superabrasive grit is disposed may be uniform, or may be calculated to provide superabrasive members with particular cutting or sawing abilities. For example, the superabrasive particles may be disposed in varied concentrations to compensate for uneven wear patterns. Thus, the diamond or CBN distribution for the cutting edge of a saw may have a greater distribution of diamond or CBN particles in the lead edge and sides than in the middle portion which is generally subjected to less wear. Likewise, the sizes of the superabrasive particles can be controlled to provide a cutting, grinding, etc., surface which is tailored to the particular uses and wear patterns for the tool.

Yet another aspect of the present invention is to mix diamond/CBN grits with a metal powder in a conventional manner. However, instead of pressing the mixture to form a body, the metal powder is glued with a binder and rolled to form a sheet or layer. In this case, although diamond/CBN grits distribution does not form a predetermined pattern, the grit distribution is much more uniform than mixing metal powder with diamond grits to form thick body by a conventional mixing process. The layers thus formed can then be stacked up to form the final body. In this case, powders are already locked in layers so they cannot segregate.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Before the present invention comprising metal bond diamond tools that contain uniform distribution of diamond grits and the method for the manufacture thereof is disclosed and described, it is to be understood that this invention is not limited to the particular process steps and materials. In disclosing and claiming the present invention, the following terminology will be used in accordance with the definitions set out below.

As used herein, the terms set herein as such process steps and materials may vary somewhat. It is also to be understood that the terminology employed herein is used for the purpose of describing particular embodiments only and is not intended to be limiting since the scope of the present invention will be limited only by the appended claims and equivalents thereof.

It must be noted that, as used in this specification and the appended claims, the singular forms "a," "an," and "the" include plural referents unless the context clearly dictates otherwise. Thus, for example, reference to a metal bond diamond containing "a diamond grit" includes a mixture of two or more diamond grits, reference to "a superabrasive" includes reference to one or more of such superabrasives, and reference to "a metal" includes reference to a mixture of two or more of such metals.

"Diamond grit" and "superabrasive grit" are used interchangeably in this application, and include diamond, CBN, or other superabrasive grits.

"Grit" and "particle" are used interchangeably in this application, referring to particles which is significant larger than a powder, usually with a size of at least 400 U.S. mesh (40 micrometer).

"Metal bond diamond tools" refers to superabrasive tools wherein the superabrasives are diamond or other superabrasives such as CBN grits of a size larger than 400 U.S. mesh, and the grits are bonded by a metal material. Metal bond diamond tools usually include diamond saws, diamond drill bits, diamond dressers, and diamond grinding wheels. Metal bond diamond saws with uniform or patterned distributed diamond grits of the present invention include wire saws with diamond beads, circular saws with diamond segments, chain saws with diamond segments, and frame (reciprocating) saws with diamond segments. Except for the diamond grinding wheels, polishing, and lapping tools that contain diamond grits smaller than 60 mesh, all other metal bond diamond tools contain diamond grits larger than 60 mesh.

References will now be made to the drawings in which the various elements of the present invention will be given numeral designations and in which the invention will be discussed so as to enable one skilled in the art to make and use the invention. It is also understood that the following description is only exemplary of the principles of the present invention, and should not be viewed as narrowing the pending claims.

Figure 1A:
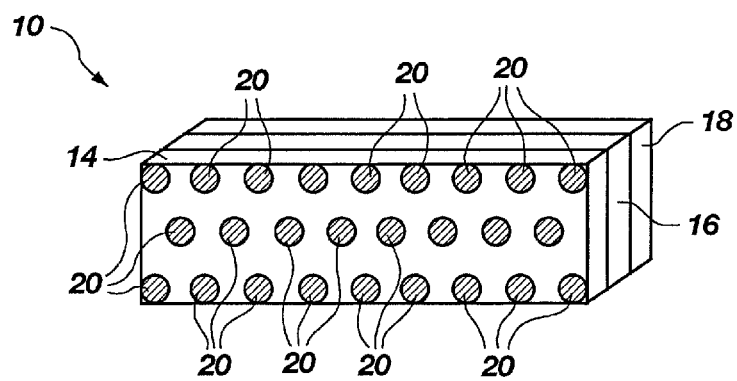
FIG. 1A shows a segment from a superabrasive tool formed by a plurality of linear, longitudinal layers disposed adjacent one another to form a three-dimensional superabrasive member.

Referring to FIG. 1A, there is shown a perspective view of a segment, generally indicated at 10, from a metal bond superabrasive tool (the remainder of which is not shown). The segment 10 is formed by a plurality of layers, 14, 16, and 18, which are impregnated with superabrasive grits, indicated by the dark circles 20. The plurality of layers 14, 16 and 18 are disposed adjacent to one another in a linear, longitudinal array so that the layers form the three-dimensional superabrasive segment 10.

As will be discussed in additional detail below, forming the segment 10 in a plurality of thin layers provides remarkably improved control over the distribution of the superabrasive grits. By controlling the distribution of the superabrasive grits within each layer and then combining the layers, a three-dimensional segment can be formed in which the distribution of the superabrasive grits is controlled in each dimension. This, in return, enables the formation of segments which are particularly adapted to the intended use of the segment, such as cutting, sawing, grinding, etc. By tailoring the distribution and concentration of the superabrasive grits within the segment 10, more precise control is given over performance of the tool under actual working conditions.

For example, when using a diamond saw blade to cut rocks (e.g., granite), the two sides of the diamond saw segments are cutting more materials than the center. As the result of uneven wear, the cross section of the saw segment becomes convex in shape with the center bulging above both sides. This configuration typically slows the cutting rate of the saw blade. Moreover, the protruding profile may also cause the saw blade to deflect sideways in the cut slot. In order to maintain a straight cutting path, it is sometimes desirable to make a "sandwich diamond segment" to reinforce both sides of the segment with layers impregnated with more diamond or superabrasive grits. Such a "sandwich segment" is difficult to manufacture by mixing diamond grit with metal powder by conventional means, but it can be easily accomplished by methods of the present invention: first planting diamond grits with desirable patterns and concentrations in a metal matrix layer and then assembling these metal matrix layers with diamond grits impregnated in the predetermined patterns and concentrations together to form a sandwiched segment.

Figure 1B:
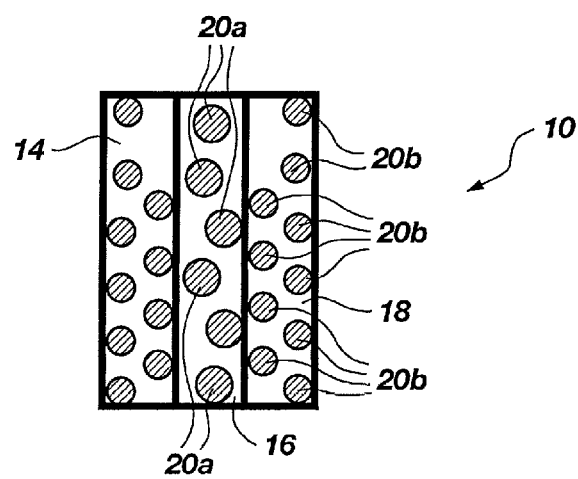
FIG. 1B shows a cross-sectional view of one likely configuration of the tool segment shown in FIG. 1A, wherein a layer formed by a metal matrix and a relatively large superabrasive grit is sandwiched between two layers of metal matrix which have smaller grit and higher concentrations of the superabrasive.

In accordance with the present invention, a cutting segment can be formed to resist premature wear to the sides of the segment, thereby extending the cutting segment's useful life. Referring specifically to FIG. 1B, there is shown a cross-sectional view of the cutting segment 10 of FIG. 1A. Unlike the cutting segments of the prior art, the cutting segment 10 is formed of three layers, 14, 16 and 18 respectively. The middle layer 16 has a plurality of superabrasive grits 20a of a first size (typically 40/50 U.S. mesh) and a first concentration (e.g. 20). The outer layers 14 and 18, in contrast, have a plurality of superabrasive grits 20b, which are of a second size (typically 50/60 U.S. mesh), smaller than the first size, and in a second concentration which is greater than that present in the middle layer 16 (e.g. 23). The smaller, more densely distributed superabrasive grits 20b provide the outer layers 14 and 18 with a greater resistance to wear as they cut through concrete, rock, asphalt, etc. Because the outer layers 14 and 18 are more wear resistant, the cutting segment 10 avoids problem of formation of a convex outer surface, as has traditionally occurred with conventional cutting tools. By maintaining a more planar cutting surface or even a concave profile, the cutting segment of the present invention can maintain a straighter cutting path and have a longer useful life. Moreover, by using a smaller grit on the flank of the saw, the finish of the cut surface is smoother. Furthermore, chipping of the workpiece can be avoided.

Figure 2A:
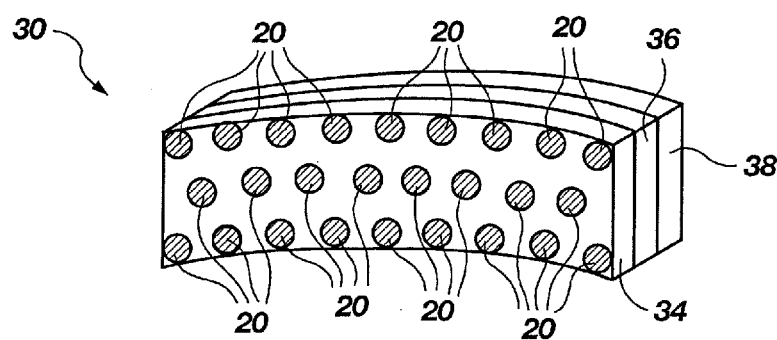
FIG. 2A shows a segment from a superabrasive tool formed by a plurality of arcuate, longitudinal layers which are attached to one another to form a three-dimensional superabrasive member.

Another advantage to the use of multiple layers of metal matrix impregnated with diamond or cubic boron nitride particles is that the layers are easily formed into other desirable shapes. For example, FIG. 2A shows a perspective view of a saw segment, generally indicated as 30, of a superabrasive tool formed by a plurality of arcuate, longitudinal layers which are attached to one another to form a three-dimensional tool member. In this example, the segment 30 is formed from first, second and third layers, 34, 36, and 38, each of which are arcuate. When the three are joined together, an arcuate segment 30 is created. Such a segment, of course, may be used on cutting tools for and on other types of tools for which a nonlinear superabrasive segment is desired. Because the layers 34, 36 and 38 are initially formed independent of one another, they are much easier to conform to a desired shape, and are able to made so while the superabrasive particles 20 disposed therein are held in their predetermined positions.

Each of the layers shown in the drawings is impregnated with a plurality of superabrasive particles 20, typically diamond or cubic boron nitride. Because each layer is a relatively thin layer of metal matrix, (i.e., the metal matrix is usually no more than two times the thickness of the diameter of the particles), superior control over placement of the superabrasive particles in the metal matrix layer can be easily achieved. As discussed above, the random placement of superabrasives in tools in the current art often lead to ineffective use of superabrasive particles. By controlling distribution of superabrasives the present invention enables either even distribution which prevents under or over spacing, or controlled distribution so that different portions of the segment have different sizes and concentrations which are matched to prevent traditional wear patterns.

Figure 2B:
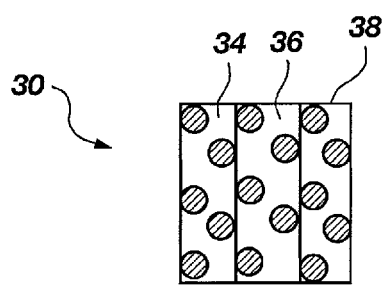
FIG. 2B shows a cross-sectional view of a plurality of layers of metal matrix as may be used with the segment shown in FIG. 2A.

Referring now to FIG. 2B, there is shown a cross-sectional view of a plurality of the layers 34, 36 and 38 of the segment 30. Of course, the superabrasive particle may be used with the segment shown in FIG. 1A or FIG. 2A. Unlike the embodiment of FIG. 1B, the layers are each provided with the same size and concentration of the superabrasive particles 20. However, because the spacing is essentially uniform, there is no underspacing or overspacing between the superabrasive particles, and the segment 30 wears more evenly than the segments of the prior art with their randomly spaced particles. The more even wear prevents premature failure of the segment 30, and thus extends the life of the tool while keeping the amount of superabrasive used to a minimum.

Figure 3:
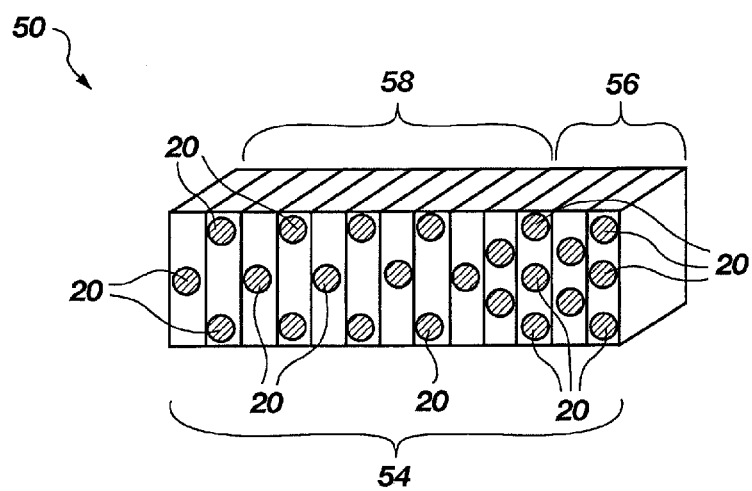
FIG. 3 shows another possible layout of a segment of a cutting tool with transverse layers configured with a more dense or higher concentration of superabrasive grits disposed at a forward, cutting end of the three-dimensional superabrasive member.

FIG. 3 shows another possible embodiment of a segment 50 made in accordance with the method of the present invention. The layered structure in a diamond or CBN segment may also be assembled transversely or horizontally. Thus, the segment 50 in FIG. 3 is formed from a plurality of transverse layers, generally indicated at 54. A first plurality of layers, indicated at 56 are provided with a first concentration of superabrasive particles 20 (represented by four layers, that contain superabrasive particles 20 distributed within an offset pattern). A second plurality of layers, indicated at 58, are provided with a second concentration, less than the first concentration (represented by nine layers with an offset pattern of superabrasive particles 20).

Many cutting tools are configured such that the cutting segment is provided with a lead edge which performs a majority of the cutting and which receives most of the impact force when contacting the workpiece to be cut. For example, a circular saw blade will usually have a plurality of teeth (saw segments), each tooth having a leading edge which takes the force of the cutting. Because the leading edge performs a significant portion of the cutting, it is much more susceptible to wear than are the rotationally trailing portions of the tooth. When formed in accordance with the prior art, the teeth, however, often had similar concentrations of abrasive particles disposed therein. Over time the leading edge wears significantly, but the trailing layers remain with minimal wear. Eventually, the abrasive of the saw tooth is worn off the leading edge, while significant amounts remain on the tail end. Thus, a considerable amount of superabrasive is wasted when the blade is discarded.

The embodiment of FIG. 3 is specifically configured to overcome such concerns. The layers 56 and 58 are configured to provide substantially even wear across the cutting segment 50 by placing a larger percentage of the superabrasive particles 20 near the leading edge layers 56, than on rotationally distal portions 58. Thus, by the time the leading edge 56 has reached the end of its useful life, the remaining portions 58 of the cutting segment 50 may also be worn out. Such controlled distribution of the superabrasive particles 20 decreases the use of the expensive material and lowers the cost for making the cutting segment 50 without impeding performance. Additionally, by providing more ever wear, the cutting segment 50 will often be able to maintain most of its cutting speed until shortly before the end of its useful life.

Figure 4:
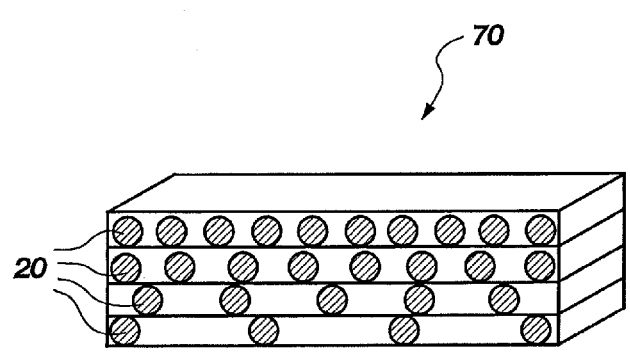
FIG. 4 shows yet another layout of a segment wherein a three-dimensional superabrasive member is formed with progressively denser abrasive distribution toward the upper surface of a tool with horizontal layers.

FIG. 4 shows yet another layout of a segment 70 wherein a three-dimensional superabrasive member is formed with progressively denser abrasive distribution toward the upper surface of a tool with horizontal layers. It is often found that the speed of cutting tends to decrease with the wear of the tool. Thus, with a reduced concentration of superabrasive particles, the tool can maintain its current cutting speed at a constant power of the machine. Thus, as with the embodiment of FIG. 3, the controlled distribution of the superabrasive particles 20 forms an improved abrasive segment 70, while at the same time decreasing the cost of abrasive tools by saving those superabrasive particles which are not needed.

With routine experimentation and the teachings of the method of the present invention, those skilled in the art will be able to customize cutting, drilling, grinding, polishing and other types of abrasive segments which are specifically formed to maximize their performance (i.e, cutting, drilling, grinding, etc.) over an extended useful life, while simultaneously decreasing the amount of expensive superabrasive which is used to form the tool.

Referring now to FIGS. 5A through 5D, there is shown one method for forming layers in accordance with the principles of the present invention. The first step of the method is to form a sheet 100 of matrix material 104 which will be bonded to the superabrasive particles 20. The sheet 100 of matrix material 104 can be formed from conventional metal powders as discussed above, or of any other suitable bonding agents.

There are many ways that a metal matrix powder can be made into the sheets 100. For example, the powder can first be mixed with a suitable binder (typically organic) and a solvent that can dissolve the binder. This mixture is then blended to form a slurry having a desired viscosity. In order to prevent the powder from agglomerating during the processing, a suitable wetting agent (e.g., menhaden oil, phosphate ester) may also be added. The slurry can then be poured onto a plastic tape and pulled underneath a blade or leveling device. By adjusting the gap between the blade and the tape, the slurry can be cast into a sheet with the right thickness. The tape casting method is a well known method for making thin sheets out of powdered materials and it works well with the method of the present invention.

Alternatively, the metal powder can be mixed with a suitable binder and its solvent to form a deformable cake. The cake can then be extruded through a die with slit opening. The gap in the opening determines the thickness of the extruded plate. Alternatively, the material can also be drawn between two rollers with adjustable gap to form sheets with the right thickness.

It is desirable to make the sheets pliable for subsequent treatments (e.g., bending over a tool substrate which has a curvature). Therefore, a suitable organic plasticier may also be added to provide the desired characteristics.

The use of organic agents for powder (metal, plastics, or ceramics) processing is documented in many text books and it is well known by those skilled in the art. Typical binders include polyvinyl alcohol (PVA), polyvinyl butyral (PVB), polyethylene glycol (PEG), paraffin, phenolic resin, wax emulsions, and acrylic resins. Typical binder solvents include methanol, ethanol, acetone, trichlorethylene, toluene, etc. Typical plasticizers are polyethylene glycol, diethel oxalate, triethylene glycol, dihydroabietate, glycerine, octyl phthalate. The organic agents so introduced are used to facilitate the fabrication of metal layers. They must be removed before the consolidation of metal powders. The binder removal process (e.g., by heating in a furnace with atmospheric control) is also well known to those skilled in the art.

Once the sheet 100 of matrix material 104 is formed, a template 110 is laid on the top of the sheet. The template 110 contains apertures 114 that are larger than one abrasive particle 20, but smaller than two abrasive particles, thereby allowing a single particle so of the abrasive to be disposed at each specific location.

In this example, the thickness of the template is preferably between $\frac{1}{3}$ to $\frac{2}{3}$ of the diameter of the average abrasive particle 20. However, other thicknesses may be used if appropriate accommodations are made for seating the abrasive particles in the desire locations.

After the template 110 is properly positioned, a layer of abrasive particles 20 is then spread over the template so that each aperture 114 receives an abrasive particle. Those particles not falling into the apertures 114 in the template 110 are removed by tilting the substrate, sweeping the template with a brush, or some other similar method.

Figure 5A:
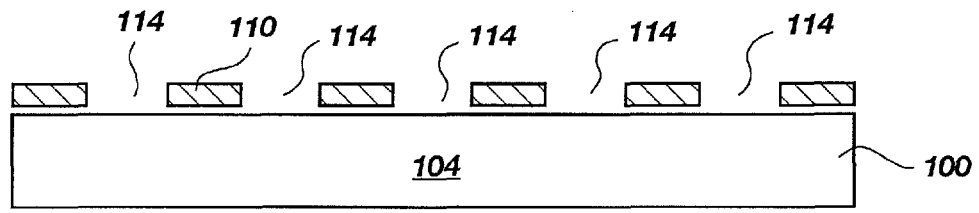
FIGS. 5A through 5D show one possible method for forming layers with controlled superabrasive distribution within the layer.
Figure 5B:
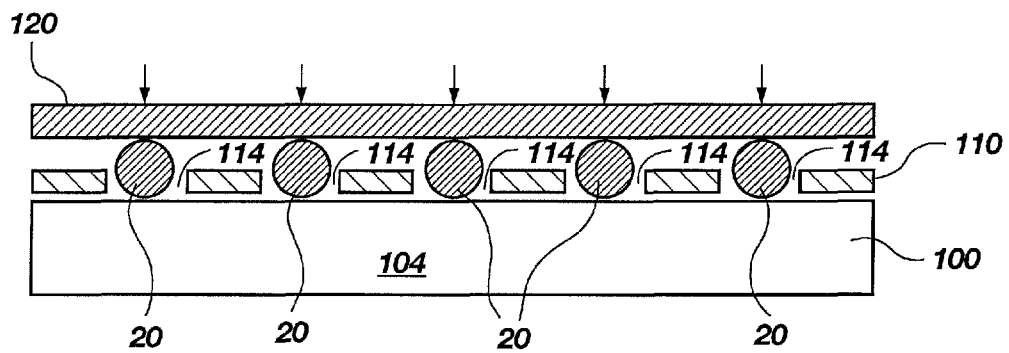

As shown in FIG. 5B, a generally flat surface 120, (such as a steel plate) is then laid over the particles 20 which rest in the apertures 114 in the template 110. The flat surface 120 presses the abrasive particles 20 at least partially into the pliable sheet 100 of matrix material 104 to seat the particles.

Figure 5C:
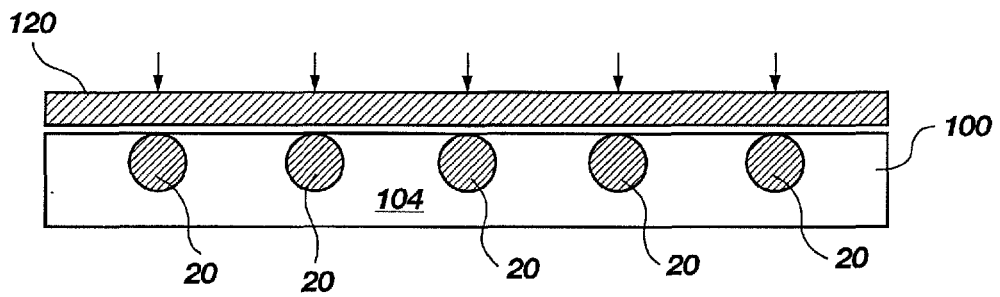

After removing the template 110, the flat surface 120 is used again to press the abrasive particles 120 firmly into the sheet 100 of matrix material 104 as shown in FIG. 5C. While the flat surface 120 is preferable, those skilled in the art will appreciate that there may be occasions when it is desirable to have abrasive particles protruding above the metal sheet 100 with equal height. Alternatively, some of the abrasive particles 20 may want to be extended outward from the sheet 100 of matrix material more than that of other abrasive particles. In such situations, a contoured or otherwise shaped surface could be used to seat some of the abrasive particles 20 deeper into the sheet 100 of matrix material 104, than other particles.

Figure 5D:
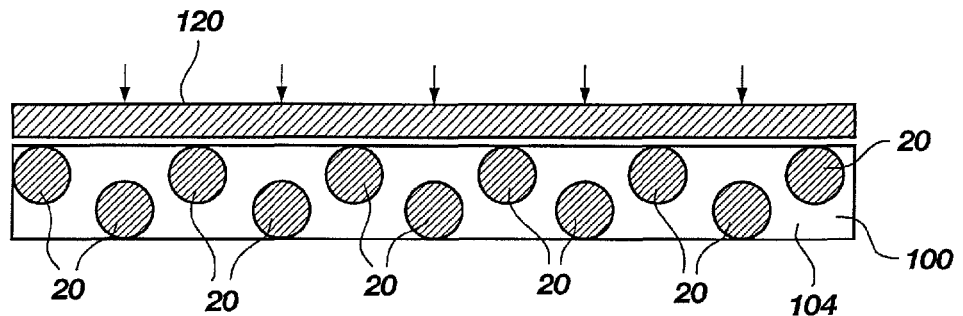

If desired, the process shown in FIGS. 5A through 5C can be repeated on the other side of the sheet 100 of matrix material 104 (as shown in FIG. 5D), to form an impregnated layer having abrasive particles 20 distributed throughout the layer in some predetermined, desired pattern. The process is typically repeated several times to obtain multiple thin layers or sheets 100 which are impregnated with the abrasive particles 20. Of course, each sheet 100 needs not have the same distribution pattern for the abrasive particles 20, nor does it need the concentration of the abrasive particles to be the same.

The abrasive impregnated sheets 100 are then cut to any desired size and shape. The sheets 100 are then assembled to form the tool segment or the entire tool body where appropriate. Typically, the assembly of the sheets 100 is accomplished by a known method such as cold compaction with a press. The "green" body so formed can then be consolidated to form a final tool product by conventional methods of sintering or infiltration as described by the following examples.

While the method described in FIGS. 5A through 5D is preferred for many applications, there are instances where it is desirable to have the abrasive particles 20 extend outwardly from the sheet 100 of matrix material. For example, some tools may only have one layer of abrasive. This can be accomplished simply by leaving the template 110 in place when performing the steps shown in FIGS. 5A and 5B, and not further pressing the particles 20 into the matrix material once the template has been removed.

Figure 6A:
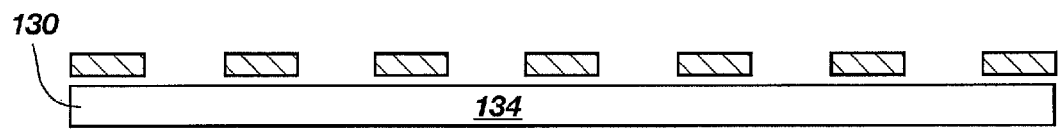
FIGS. 6A through 6C shows an alternate method for forming one or more layers with controlled superabrasive distribution.
Figure 6B:
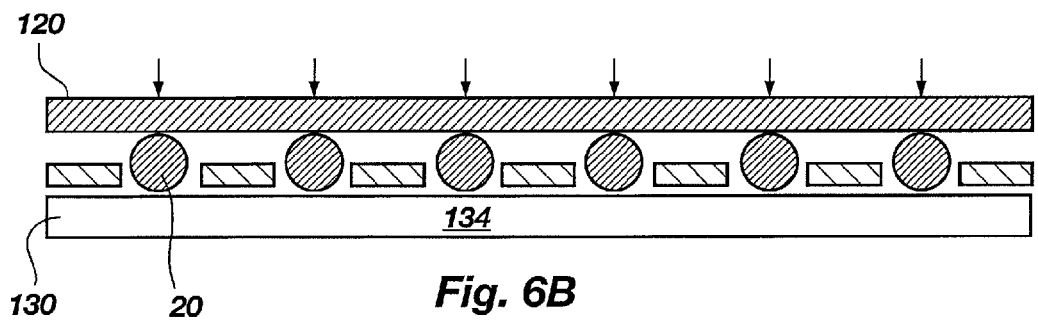
Figure 6C:
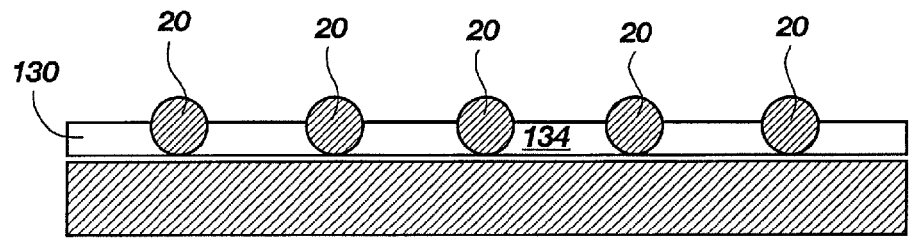

In the alternative, FIGS. 6A through 6C show a side view of an alternate to the method discussed in FIGS. 5A through 5D. The sheet 130 of matrix material in FIGS. 6A through 6C is thinner than the height of the superabrasive particles 20. Thus, in this procedure, when the particles are pressed into the sheet 130, the particles 20 would protrude above the matrix material 134.

The present invention is intended for making metal bond superabrasive tools containing superabrasives distributed in a predetermined three dimensional pattern, which provides a significant improvement over the prior art where the abrasives are typically random and non-uniformly distributed. The methods illustrated in FIG. 5A, the rough 6C offer several advantages over conventional technology. For example, by making diamond particles distributed in a desirable pattern, the load cutting can be evenly distributed to all diamond particles. As a result, the tool can cut faster and have a longer life.

The performance may be further improved by having a braze layer of uniform thickness. This uniformity can allow a better diamond or CBN retention and easier debris removal. Moreover, by fully utilizing each diamond particle for cutting, the concentration of diamond can be reduced. As discussed, diamond cost often accounts for about half of the total manufacturing cost of a diamond tool. Hence, by practicing this invention, manufacturing cost can be reduced substantially.

Also shown in FIG. 6A through 6C is the principle that the spacings of the apertures in the template 130 need not be uniform. Rather, variations in spacing can be provided to facilitate different concentrations on various portions to facilitate different concentrations on various portions of the sheet 130 of matrix material 134. Likewise, by controlling the size of the apertures 138 and the order in which the diamond particles are placed in the apertures, a single layer could be provided with particles of different sizes.

In addition to being able to improve the performance of the tool and to reduce the cost of manufacturing, this invention also provides an easier method for making thin bladed tools. For example, the electronic industry requires using larger and larger silicon wafers (now 12 inches in diameter). Hence, thinner saw blades for slicing silicon crystals, and thinner dicing wheels for grooving silicon chips with tighter partitions have been in great demand.

Prior to the present invention, it has been extremely difficult to make very thin tools that contain evenly distributed diamond particles. The present invention provides an alternative method for making such tools. For example, it has been discovered that by mixing micron powders of diamond, a blend of metal powders (e.g., bronze and cobalt) and a suitable binder, the material can be rolled to a thickness thinner than 0.1 mm—a thickness which is thinner than most dicing wheels. By firing this thin sheet and mounting it on a tool holder, a thin dicing wheel can be made.

In the alternative to the above, it has been found in accordance with the present invention that some of the advantages of the controlled distribution, multilayered superabrasive configurations described above can be achieved without the use of a template. More specifically, the superabrasive particles can also be mixed in with the matrix powder and made as an ingredient of the layered sheet. In this case, the distribution of abrasive particles are still somewhat random. Even so, their distribution is typically more uniform than that in a conventional abrasive body. The segregation of superabrasive particles and matrix powders discussed in the background section is less extensive in a substantially two-dimensional sheet than in a three-dimensional body. This is particularly true for sheets made by a deforming process (e.g., by rolling). In this case, superabrasive particles are further spread out in the matrix by the shearing action of the rollers.

This invention may also be applicable to other applications not related to making abrasive tools. For example, graphite or metal sheets planted with diamond particles may be used as seeds for diamond growth under high pressure and temperature. Industrial diamonds are typically produced by compressing alternative layers of graphite and metal catalyst (e.g., Fe, Co, or Ni alloy) to high pressure and heating above the melting point of the catalyst. Diamond will then nucleate randomly on the interface of these layers. The quality of the diamond crystal formed often suffers by the impingement of growing crystals that are distributed unevenly. Hence, the yield and cost of diamond synthesis can be substantially improved by making the nuclei uniformly distributed. This invention can provide layers of either graphite or metal catalyst with a pre-determined pattern of diamond seeds. If organic binders are introduced during the fabrication of these layers, they can be removed by heating in a furnace before loading into the press.

The following are examples that illustrate preferred embodiments of the invention but are intended as being representatively only.

Example 1

40/50 mesh diamond grit (SDA-85$^+$ made by De Beers Company) were mixed with metal powder to form a mixture with a diamond concentration of 20 (5% of total volume). Five different proportions of cobalt (about 1.5 micrometer in size) and bronze (about 20 micrometers in size) were used for the matrix powder. An acrylic binder was added (8% by weight) to the mixture and the charge was blended to form a cake. The cake was then rolled between two stainless steel rollers to form sheets with a thickness of 1 mm. These sheets were cut in the shape of saw segments with a length of 40 mm and width of 15 mm. Three each of such segments were assembled and placed into a typical graphite mold for making conventional diamond saw segments. The assembled segments were pressed and heated by passing electric current through the graphite mold. After sintering for three minutes, the segments were consolidated to a height of 9 mm with less then 1% porosity. Twenty-four segments for each composition were fabricated. They were brazed onto a circular saw of 14 inches in diameter. These blades were used for cutting granites and found to perform equal or better than those with higher diamond concentrations (e.g. 23) made by conventional methods. Microscopic examination of the worn segment indicated that, although diamond particles were not planted into the layered matrix, they were distributed more evenly than segments prepared by the traditional method. The segregation of particles in a layered matrix was considerably less than that in the thick body of conventional segments.

Example 2

The same procedures were followed as Example 1, but with 8 thinner layers (0.4 mm) being used to form each segment. The diamond concentration was reduced to 15 and particles were planted according to the illustration as shown in FIGS. 5A through 5D, for each layer. The diamond distribution was much improved. As a result, the performance of these blades were equal or better than those made by conventional methods with diamond concentration of 20.

Example 3

Iron powders of about 100 mesh were mixed with an S-binder made by Wall Colmonoy Company to form a cake. The cake was then rolled to form sheets of 0.4 mm in thickness. 40/50 mesh SDA-100 diamond grit was planted into these sheets to attain a concentration of 15. These diamond containing sheets were cut in the shape of saw segments with a length of 40 mm and width of 9 mm. Eight of such segments were assembled as a group and placed in a graphite mold. Twenty-four groups were placed horizontally, and another twenty-four groups were placed vertically in the graphite mold. Nicrobraz LM powder (−140 mesh) (made by Wall Colmonoy Company) was added on the top of these segments. These samples were heated in a vacuum furnace ($10^{-5}$ torr) to 1050° C. for 20 minutes for horizontally placed segments, and 30 minutes for vertically placed segments. The melted LM alloy (Ni—C—B—Si with a liquidus point at 1000° C.) infiltrated into these segments and filled the porosity. The excess LM braze on these segments were ground by electrode discharge (EDG). Each of the 24 segments so fabricated were brazed onto a 14 inch (diameter) circular saw blade. These blades were used to cut granite and showed marked improvement over conventional saw blades.

Example 4

Nicrobraz LM powder was mixed with an acrylic binder and rolled to form layers of about 0.25 mm. 40/50 mesh MBS-960 diamond grit manufactured by General Electric Company was planted into these metal layers according to the method as illustrated in FIGS. 5A-D. These diamond planted metal layers were cut in proper size and wrapped around 2,000 beads (pearls) of wire saw. These beads (10 mm in diameter by 10 mm long) were divided into two groups, one contains 280 crystals (about 0.2 carat). These beads were heated in a vacuum furnace to a temperature of 1,000° C. for 8 minutes. These beads were mounted on several wire saws and were used to cut marble, serpentine and granite. The performance of these beads was found to be superior to conventional beads. The latter beads were typically made by either hot pressing or electroplating. These conventional beads may contain a much higher amount of diamond (up to 1 carat) per bead.

Example 5

The same method as described by Example 4, but applied to other products, e.g., circular saws, thin-wall core bits, and curvature grounder. Each of these products shows superior performance over conventional electro-plated diamond tools having similar superabrasive concentrations.

Example 6

Mixture of metal powders that contain 87 wt % of −140 mesh Nichrobraz LM (made by Wall Comonoy, U.S.), 8 wt % of iron of −125 mesh, and 5 wt % of copper of −60 mesh were mixed with 3 wt % of an acrylic binder to form a dough. The dough is rolled between two rollers to form sheets of 0.6 mm thick. Each sheet is cut to shape and covered with a template. 30/40 mesh (0.420 to 0.595 mm) diamond grits of SDA-100+ grade (made by De Beers, South Africa) were planted into the metal layers in a predetermined pattern with a diamond-to-diamond distance of about 2 mm. Three layers were stacked together and wrapped around a steel sleeve to form a diamond bead of 10 mm in diameter and 10 mm in length. These beads were heated in a vacuum furnace to consolidate the metal that also braze the diamond in place and onto the steel sleeve. 1,000 of such diamond beads were fitted over 5 mm steel cable that contained 7×19 wires and are spaced by plastic coating formed by injection molding. The wire was 25 meters long and was joined end-to-end to form a loop. This wire saw was used to cut granite blocks (3.5 meter long by 1.8 meter high) of all grades. The life achieved was 0.5 square meter cut surface per diamond bead consumed (0.5 carat). This area cut is twice of that cut by conventional diamond beads made by a powder metallurgical method.

Example 7

This is the same as Example 6, except many diamond impregnated layers were assembled to form a block 20 mm long by 5 mm thick by 7 mm high. These blocks were consolidated in a vacuum furnace to form diamond segments. Each segment contained about 8 volume percent diamond. 30 of such segments were brazed onto a 4 meter long steel frame and the fame was mounted on a reciprocating sawing machine. The saw was used to cut marble blocks and had a life more than twice as long as than conventional diamond segments produced by powder metallurgical methods.

Example 8

This the same as Example 7, except the diamond planted layers were assembled to form segments of about 24 mm long by 3.5 mm thick for core bits 150 mm in diameter. The diamond content in these segments was about 4 volume percent. Ten of such core bits were used to drill concrete. The drilling speed and the life of these core bits were much higher than conventional diamond segment bits made by powder metallurgical methods.

Example 9

This is the same as Example 8, except the shape of segments is for circular saws. These segments were brazed to make circular saws of 230 mm (with 18 segments of 40 mm by 8.5 mm by 2.4 mm), 300 mm (with 21 segments of 50 mm by 8.5 mm by 2.8 mm), and 350 mm (with 24 segments of 50 mm by 8.5 mm by 3.2 mm) in diameter. These saws were used to cut granite, asphalt, and concrete with superior performance.

Example 10

This is the same as Example 7, except the segments are used as dressers for conditioning grinding wheels.

Example 11

A single layer of 14/16 mesh (1.4 mm to 1.2 mm in size) diamond grits (natural diamond EMB-S made by De Beers) planted sheet is covered over a pellet of 20 mm diameter by 8 mm thickness. Many of these pellets were brazed in a vacuum furnace. More than 3000 of such pellets were mounted on floor grinding machines to grind stone and wood floors. The results indicate that the grinding speed could be three times faster than conventional diamond grinders.

Example 12

A single layer that contained planted diamond grits of 40/50 mesh (0.420-0.297 mm size) ISD 1700 grade (made by Iljin Diamond of Korea) was laid over the curved surface of a profile wheel and brazed to form a rigid tool in a vacuum furnace. More than 100 of such profile wheels of various diameters were used to form the edges of granite and marble slabs. These profile wheels were capable to cut more than 3 times faster than conventional diamond tools made by either electroplating or sintering method.

Example 13

This is the same as Example 12, except that the diamond planted layer is wrapped around a steel sleeve to form single layered diamond beads. More than 100,000 of such beads were manufactured. They were used to cut granite or marble with superior performance.

Example 14

This is the same as Example 11, except the diamond grits were 80/100 mesh, and the diamond planted layer was used to cover the surface of a flat disk 4 inches in diameter. Four such disks were produced and used as conditioner to dress the CMP (chemical and mechanical polishing) pad that polished silicon wafers. The result indicated that the CMP efficiency was much improved and the conditioner outlasted conventional conditioners made by either electroplating or brazing.

The above description and examples are intended only to illustrate certain potential uses of this invention. It will be readily understood by those persons skilled in the art that the present invention is suitable for a broad utility and applications. Many embodiments and adaptations of the present invention other than those herein described, as well as many variations, modifications and equivalent arrangements will be apparent from or reasonably suggested by the present invention and the forgoing description thereof without departing from the substance for scope of the invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The forgoing disclosure is not intended to be construed to limit the present invention or otherwise to exclude any such other embodiments, adaptations, variations, modifications and equivalent arrangements, the present invention being limited only by the claims appended hereto and the equivalents thereof.

What is claimed is:

1. A CMP pad dresser having a superabrasive impregnated segment, comprising:
    a flat disk having a 4 inch diameter;
    a metal matrix covering a surface of the flat disk, the metal matrix configured for bonding superabrasive particles; and
    a plurality of superabrasive particles held in the metal matrix at specific positions according to a predetermined pattern, wherein tips of each of the plurality of the superabrasive particles protrude from the metal matrix to a uniform height, wherein the uniform height has a variance that is less than or equal to 50 µm, and wherein the plurality of superabrasive particles are positioned such that superabrasive particles at edges of the flat disk are larger in size as compared to superabrasive particles at a middle portion of the flat disk.

2. The tool of claim 1, wherein the predetermined pattern is a uniform pattern.

3. The tool of claim 1, wherein the plurality of superabrasive particles is diamond or cBN.

4. The tool of claim 1, wherein the plurality of superabrasive particles is diamond.

5. A method for making a CMP pad dresser, comprising:
    applying a metal matrix to a flat disk having a 4 inch diameter;
    arranging a plurality of superabrasive particles in the metal matrix at specific positions such that the plurality of superabrasive particles are held in the metal matrix according to a predetermined pattern, wherein tips of each of the plurality of the superabrasive particles protrude from the metal matrix to a uniform height, wherein the uniform height has a variance that is less than or equal to 50 µm, and wherein the plurality of superabrasive particles are positioned such that superabrasive particles at edges of the flat disk are larger in size as compared to superabrasive particles at a middle portion of the flat disk.

6. The method of claim 5, wherein arranging the plurality of superabrasive particles includes:
    placing a template with a plurality of apertures formed therein on the metal matrix;
    filling the apertures of the template with superabrasive particles;
    pressing the superabrasive particles at least partially into the metal matrix; and
    removing the template.

7. The method of claim 5, wherein the template is configured to hold only one superabrasive particle in each aperture.

8. The method of claim 5, wherein the predetermined pattern is a uniform pattern.

9. The method of claim 5, wherein the plurality of superabrasive particles is diamond or cBN.

10. The method of claim 5, wherein the plurality of superabrasive particles is diamond.

11. A method for making a CMP pad dresser, comprising:
providing a template disposed on a flat disk having a 4 inch diameter, the template having a plurality of apertures formed therein;
filling the apertures of the template with superabrasive particles;
removing the template such that the plurality of superabrasive particles are maintained at specific positions according to a predetermined pattern; and
forming a metal matrix to hold the plurality of superabrasive particles in the predetermined pattern, wherein tips of each of the plurality of the superabrasive particles protrude from the metal matrix to a uniform height, wherein the uniform height has a variance that is less than or equal to 50 µm, and wherein the plurality of superabrasive particles are positioned such that superabrasive particles at edges of the flat disk are larger in size as compared to superabrasive particles at a middle portion of the flat disk.

12. The method of claim 11, wherein the template is configured to hold only one superabrasive particle in each aperture.

13. The method of claim 11, wherein the predetermined pattern is a uniform pattern.

14. The method of claim 11, wherein the plurality of superabrasive particles is diamond or cBN.

15. The method of claim 11, wherein the plurality of superabrasive particles is diamond.

\* \* \* \* \*